United States Patent Office 3,274,245
Patented Sept. 20, 1966

3,274,245
RECOVERY OF ACRYLAMIDE FROM ITS SALT BY VAPORIZATION WITH AN INERT GAS
William Patrick Bobsein, Plainfield, and Joseph Fidelis Mellor, Jr., Westfield, N.J., assignors to American Cyanamid Company, Stamford, Conn., a corporation of Maine
No Drawing. Filed July 9, 1963, Ser. No. 293,884
6 Claims. (Cl. 260—561)

This invention relates to the preparation of acrylamide. More particularly, it relates to the isolation of acrylamide from acrylamide sulfate. Even more particularly, it relates to a process for the recovery of acrylamide from the neutralization products obtained by treating acrylamide sulfate with a base.

Acrylamide and its polymerization and copolymerization products have become of increasing importance particularly in the fields of adhesives, dispersants, plasticizers, surface coatings, thickening agents, as well as in the leather, paper, textile and photographic arts. In view of these many potential applications, increased interest in improved processes for the production of monomeric acrylamide has developed.

A well known method for preparing acrylamide comprises hydration of acrylonitrile with concentrated sulfuric acid. The resultant product, acrylamide sulfate, must then be further treated in order to isolate free acrylamide. Isolation of free acrylamide by drowning the reaction mixture in a large volume of water and then recovering acrylamide is not possible. As a consequence, other procedures have been proposed and adopted for isolation of water soluble acrylamide from acrylamide sulfate. Such procedures generally comprise treating acrylamide sulfate either in an aqueous or an organic solvent solution or in substantially anhydrous form with a base, such as ammonia, an alkaline earth metal or an alkali metal hydroxide, or an alkali metal carbonate, or the like.

When an aqueous acrylamide sulfate solution is so treated, the sulfuric acid is thus recovered as a salt, i.e., ammonium sulfate, calcium sulfate, magnesium sulfate, potassium sulfate, sodium sulfate, etc., leaving behind an aqueous solution of acrylamide monomer. After separation, the aqueous acrylamide solution is concentrated and/or cooled to crystallize acrylamide which is then separated by conventional means.

When acrylamide sulfate is dissolved in an organic solvent, i.e., methanol, isopropanol, etc., in which the salt obtained upon neutralization is insoluble, the salt is separated in a manner similar to the treatment of acrylamide sulfate in an aqueous medium. Acrylamide remains dissolved in the organic medium. This solution is then concentrated, usually by vacuum evaporation and/or cooled and monomeric acryamlide is isolated.

When acrylamide sulfate in substantially anhydrous form is neutralized, monomeric acrylamide is recovered by vacuum distillation.

Each of these separative techniques is subject to certain disadvantages. For example, in the neutralization of acrylamide sulfate in an aqueous solution, a considerable amount of dissolved acrylamide is retained by the salt cake when it is separated from the solution. Extensive washing of the cake with either water or an organic solvent is required in order to recover the acrylamide thereon. Recycling steps are thus essential in order to recover the acrylamide values from such washings which may contain a considerable portion of the water-soluble salts.

The disadvantages of neutralization in an organic solvent medium are principally cost and time. In addition, difficult recovery problems of isolating acrylamide from the by-product salts sometimes occur. Using either method for neutralization brings about a disposal problem of the by-products, especially the salts. Thus, in order to reduce the number of washing and recycling steps, relatively large amounts of acrylamide are left on the cake. Frequently, the cake is disposed of as waste containing valuable amounts of acrylamide which, if recovered, could reduce the overall cost of manufacture and which, if not recovered, presents a waste disposal problem. Moreover, the presence of acrylamide in the cake adds a potential health hazard in the handling of the cake.

The alternative method of neutralization, that is, treating acrylamide sulfate in a substantially anhydrous state also leaves much to be desired. Thus, after acrylamide sulfate is neutralized, it is essential that the vacuum processing equipment be employed to separate monomeric acrylamide, thereby increasing costs. Yet, the by-product salt still may contain trace to large amounts of acrylamide resulting in problems similar to those in the processes in which acrylamide sulfate is neutralized in an aqueous or organic solvent medium.

Accordingly, it is an object of the present invention to overcome the numerous disadvantages of previously known procedures for the recovery of acrylamide from a neutralization mixture.

It is also an object of this invention to provide a process whereby substantially all of the acrylamide obtained upon neutralization of acrylamide sulfate is recovered with a minimum of processing steps.

It is a still further object of this invention to afford a process for the isolation of acrylamide from a salt or salts obtained when acrylamide sulfate is treated with a neutralizing agent.

It is also an object of this invention to offer a process for the recovery of acrylamide from by-product salt or salts obtained by neutralization of acrylamide sulfate so that such salt or salts heretofore discarded may be efficiently and easily recovered while at the same time offering the by-product salt or salts substantially free from contamination with acrylamide.

It has now been discovered that acrylamide may be recovered or isolated from the by-products obtained when acrylamide sulfate is treated with a neutralization agent such as ammonia, alkaline earth metal or alkali metal hydroxides and alkali metal carbonates. Thus, a process has now been found whereby substantially all of the acrylamide obtained when acrylamide sulfate is neutralized can be recovered from by-product salt or salts by passing an inert gas at critical volume rates and temperatures through and over an acrylamide containing neutralization product. In general, the process of this invention comprises contacting a by-product salt or salts such as ammonium sulfate, calcium sulfate, magnesium sulfate, potassium sulfate and sodium sulfate with an inert gas at a volume and temperature sufficiently high so as to vaporize the acrylamide which is present and is carried as a solution or in the solid phase on the by-product. After the gas is passed through the by-product which contains acrylamide, the solid by-product is discharged as a substantially dry powder from the chamber wherein vaporization of acrylamide takes place and a mixture of acrylamide vapor, feed gas and solvent vapors, either organic or water, which may be present, is sent for further processing and recovery of acrylamide. Thus, for example, the mixture of acrylamide vapor, feed gas and solvent vapors may be sent to a scrubber wherein the mixture is contacted with water or an organic solvent and the resultant aqueous or organic solvent solution of acrylamide is then withdrawn. Alternatively, the mixture of acrylamide vapor, feed gas and solvent vapors may be admitted to a condenser, e.g., a desublimation chamber of proper design, so as to collect solid acrylamide.

Typical features and advantages of the present invention include: (1) acrylamide can be recovered as a solution by absorption in water or suitable organic solvent. This solution can be of sufficiently high purity for direct use in further chemical reactions, e.g., polymerization, since little of the by-product contaminates the solution. This solution may also be processed through any of the standard isolation techniques such as crystallization or distillation to later obtain solid acrylamide; (2) acrylamide may be recovered as a solid from a suitable condenser; (3) acrylamide solutions of higher concentration can be obtained more directly than are possible from other techniques such as washing or leaching of the by-product with water or other solvents or separation by ion exchange; (4) water or organic solvents may be employed for absorption of the acrylamide vapors. Since the absorption medium does not contact the by-product, a wide variety of absorbents may be employed which might not otherwise be useful as solvents in the direct washing or leaching of the by-product for reasons of chemical incompatibility.

While applicants do not wish to restrict their invention to any particular theory, it should be pointed out that the invention is predicated upon the discovery that by taking advantage of one of the physical properties of acrylamide, namely its high vapor pressure, a separation or isolation of acrylamide can be accomplished in a feasible and economical manner from by-product salts obtained from the neutralization of acrylamide sulfate. Acrylamide, as a solid, M.P. 84–85° C., has a vapor pressure of 0.14 mm. Hg at 40° C., 0.21 mm. Hg at 50° C. and 1.77 mm. Hg at 85° C. The vapor pressure of acrylamide increases rapidly above its melting point. For example, at 90° C. the vapor pressure is approximately 2.3 mm. Hg, approximately 4.0 mm. Hg at 100° C., 7.0 mm. Hg at 110° C. and 13.0 mm. Hg at 120° C. From this observation of the property of vapor pressure, it has been surprisingly discovered that acrylamide may be readily separated and isolated from any by-product salt whose vapor pressure is below that of acrylamide at the temperature at which a gas is permitted to contact such by-product salt which contains acrylamide. Thus, instead of utilizing the solubility characteristics of acrylamide in water or other solvents, as is used in the widely practiced washing of by-product salt cakes for recovery of acrylamide therefrom, a simple isolation procedure using an inert gas to vaporize acrylamide is afforded by the present invention. Thus, the operation may be conducted at any temperature by varying the amount of gas as opposed to the conventional method of removal of acrylamide from by-product salts by vacuum distillation where the temperature is fixed by the vacuum attainable.

A particularly advantageous feature of the process of this invention is the discovery that acrylamide vapors resulting from the contacting of by-product salts which contain acrylamide with a suitable inert gas may be handled at temperatures above those where polymerization would ordinarily occur with acrylamide solutions. Thus, while it has been previously suggested by others that the heating of acrylamide as a solid or in solution should be avoided because it is heat sensitive and polymerizes readily, it has been found that in carrying out the process of this invention acrylamide although being subjected to heat is nevertheless not polymerized. Further, although previous workers have utilized polymerization inhibitors for solutions of acrylamide in order to stabilize such solutions against polymerization on exposure to high temperatures during the recovery process, the use of an inhibitor herein is not ordinarily required.

One embodiment of the present invention comprises neutralizing an acrylamide sulfate, obtained by the hydration of acrylonitrile with sulfuric acid, and contacting the resultant mixture of acrylamide and by-product salt with an inert gas in a chamber. Such mixture may be substantially anhydrous or it may be an aqueous or organic solvent slurry of acrylamide and by-product salt. The flow and temperature of the gas admitted to the chamber are such as to vaporize substantially all of the acrylamide and to carry it in the gas. The gas, now containing acrylamide, is then vented to a scrubber or condenser for recovery of acrylamide therefrom. The by-product salt is recovered as a substantially dry solid from the chamber into which the gas is admitted and is subsequently processed or disposed of in a manner which forms no part of the present invention.

Another embodiment of the present invention comprises neutralizing acrylamide sulfate in an aqueous or in an organic solvent solution. From the neutralization vessel, a slurry of by-product and acrylamide solution is fed to a separator in which by centrifuging, settling, filtering or the like, the by-product salt is removed and an aqueous solution or an organic solvent solution of acrylamide is processed further. This alternative embodiment is concerned with removal or isolation of acrylamide contained within and on the by-product salt after separation of such salt from the neutralization mixture by centrifuging, settling, filtering, etc. Ordinarily, such salt may contain approximately 2 to 35% acrylamide thereon. Usually, such salt is, as has been pointed out hereinbefore, disposed of as waste. It is thus seen that such salt, which may contain up to about 25% acrylamide thereon, when disposed of, represents needless loss of acrylamide which might otherwise be recovered thus resulting in overall economies in the process. At the same time, the by-product salt is converted to saleable form.

Product acrylamide may be recovered from the inert gas which serves to vaporize and to carry acrylamide by feeding the gas to a cooled chamber wherein a deposit of solid acrylamide from the gas stream is achieved. Any residual acrylamide in the gas may be reclaimed by scrubbing with water or an organic solvent. The acrylamide solution may be further processed or sold as such. Alternatively, the acrylamide-laden gas may be vented directly from the vessel to which the by-product salt which contains acrylamide was admitted and then may be introduced directly to a scrubber.

As used herein, the term "gas" is intended to embrace not only a single gas, e.g., nitrogen, but also mixtures of different gases, e.g., air. It is also to include what are commonly referred to as vapors, e.g., steam or a superheated organic solvent. The gas to be employed may be any which is substantially inert to acrylamide and to the salt under the operating conditions. The gas may either be used as a solvent or as a medium to merely carry acrylamide or it may perform both functions. Thus, superheated steam, atmospheric pressure saturated steam and superheated vapors of such organic solvents as alcohols, such as methanol, ethanol, etc.; ketones, such as acetone; ethers, such as glycol butyl ether, diethylene dioxide, etc.; and the like which serve not only to carry but also to dissolve the acrylamide may be used. Alternatively an inert gas such as nitrogen, flue gas or air may also be used. Of these, air is generally preferred.

Any suitable chamber or vessel may be utilized for the contacting or treating of such by-product salt which contains acrylamide with a gas in the process of this invention. The particular type of vessel or chamber employed is not especially critical providing that such vessel or chamber permits adequate residence times of the by-product salt which contains acrylamide. Consequently, the vessel or chamber should be one which permits intimate mixing of the solid and gas and allows a proper ratio of gas flow to by-product salt feed rate. Thus, such vessel or chamber may be a rotary calciner, rotary drier, a fixed bed drier or a fluid bed drier or other suitable apparatus.

The vapor pressure of acrylamide and the molecular weight of the gas will usually be determinative of the optimum ratio of the gas flow to the feed rate but the ratio may be varied somewhat since the process has been found to be operable over a wide range of temperatures. The ratio of gas flow to feed rate is also dependent upon the amount of acrylamide contained within the by-product salt as well as the amount of water.

While the process of this invention may be conducted batch-wise, it is most advantageously practiced on a continuous basis.

The temperature of the gas employed to contact the by-product salt which contains acrylamide may be varied over an extremely wide range. Thus, temperatures of from about 20 C. (65° F.) to about 400° C. (700° F.) may be used. The utilization of higher temperatures, however, is not precluded. The upper limit of temperature may sometimes be restricted by the nature of the by-product salt from which the acrylamide is being isolated. Thus, if the by-product salt is ammonium sulfate, bed temperatures above 500° F. are not ordinarily employed since decomposition of ammonium sulfate ordinarily occurs at about such temperatures. This decomposition produces ammonia which may combine with the isolated acrylamide so as to form nitrilo-trispropionamide with a consequent loss of acrylamide. Usually, gas inlet temperatures of from about 120° C. (250° F.) to about 290° C. (550° F.) are employed so as to obtain bed temperatures of from about 80° C. (175° F.) to about 220° C. (425° F.).

The residence time of the by-product salt which contains acrylamide within the vessel or chamber is also not especially critical particularly if a rotary drier or fixed bed drier is employed. On the other hand, if a completed agitated vessel such as a fluid bed drier is employed, nominal residence times of from about ten seconds to about one hundred minutes may be used although the utilization of higher nominal residence times is not precluded. The time of residence of the by-product salt which contains acrylamide is determined primarily by the ratio of gas flow to feed rate, temperature, the type of gas being admitted and by the amount of acrylamide contained within and on the salt.

The flow rate or volume of gas is dependent principally upon the amount of acrylamide contained within and on the salt, and, as has been pointed out previously, this amount of acrylamide may be from about 2% to about 35%. The flow rate or volume of gas is also dependent upon the temperature of the bed which determines the vapor pressure of acrylamide. The flow rate or volume of gas will also vary depending upon the particular gas utilized. An example of typical flow rates for a fluid bed drier, employing air, and utilizing as feed a by-product salt comprising approximately 90% ammonium sulfate, 5% acrylamide and 5% water, was found to be from about 25 cubic feet of air/pound of feed to about 700 cubic feet of air/pound of feed.

While not an essential feature of the present invention, it is frequently desirable to admit the gas containing acrylamide to a separatory device, e.g., a cyclone for the removal of by-product salt fines. The vented gas containing acrylamide is then introduced to a condenser or to a scrubber for a water or an organic solvent wash. From such scrubber, the solution is led to a crystallizer, evaporator or distillation column, etc., in order to recover acrylamide therefrom. Alternatively, the solution may be recycled to the acrylamide sulfate neutralization vessel.

The scrubber which may be utilized forms no part of the present invention. However, a typical scrubber which may be employed in the process of this invention permits the entry of the gas containing acrylamide at the bottom thereof. Water or an organic solvent is then introduced at the top of the scrubber. Such water or organic solvent is generally at a temperature of from about 10 to about 50° C. If desired, an inhibitor such as cupferron may be introduced to the scrubber although its use is not essential. The acrylamide solution may then be recovered as such or may be further processed. The gas, now essentially free of acrylamide, may then be vented to the atmosphere or recycled to the vessel or chamber to contact additional by-product salt.

The following examples further describe the invention. These examples are illustrative only and in no way should they be limitative.

*Examples 1 to 12*

All of the tests of the examples are conducted in a 12 inch diameter fluid bed drier. The exhaust is admitted to a cyclone separator for the separation of by-product salt fines therefrom. The exhaust from the cyclone is then fed to a 2-stage tray scrubber using water as the wash medium. In each example, ammonium sulfate containing approximately 2 to 5% acrylamide, approximately 0.1 to 2% water and approximately 0.3% impurities (such as $\beta$-sulfatopropionamide and nitrilo-tris-propionamide) is used as the feed material. The feed material is sometimes screened prior to introducing the same to the drier in order to permit easy flow through a screw feed device. Air is used as the gas in all of the examples. The examples demonstrate the effect of variation of the temperature of the gas, the effect of the volume or rate of flow of the gas, the effect of nominal residence time within the drier and the effect of certain other non-critical variables.

The results of such tests are summarized in the following table.

TABLE

| Example No. | 1 | 2 | 3 | 4 | 5 | 6 | 7 | 8 | 9 | 10 | 11 | 12 |
|---|---|---|---|---|---|---|---|---|---|---|---|---|
| Feed, Lbs. Per Hr | 30 | 20 | 30 | 10 | 60 | 90 | 135 | 180 | 20 | 135 | Batch | Batch |
| Total Time of Feeding, Min | 53 | 69 | 27 | 60 | 45 | 64 | 80 | 41 | 40 | 80 | | |
| Air Flow Rate, Cu. Ft./Hr | 2,450 | 2,630 | 4,500 | 6,830 | 7,000 | 7,260 | 5,440 | 9,300 | 2,900 | 4,800 | 9,360 | 4,800 |
| Inlet Air Temperature, ° F | 335 | 545 | 430 | 385 | 415 | 340 | 405 | 400 | 285 | 370 | 400 | 400 |
| Outlet Air Temperature, ° F | 260 | 280 | 290 | 280 | 250 | 230 | 250 | 265 | 208 | 235 | 260 | 260 |
| Bed Temperature, ° F. Range | 265–275 | 330–380 | 310–385 | 305–315 | 270–275 | 250–240 | 255 | 280 | 225 | 235 | 260 | 260 |
| Retention Time, Min. (Nominal) | 28 | 42 | 28 | 84 | 14 | 13 | 12 | 5 | | 8 | [1] 60 | [1] 59 |
| Feed (Ammonium Sulfate) Analysis: | | | | | | | | | | | | |
| Percent Acrylamide | 5.01 | 5.01 | 5.01 | 5.01 | 5.01 | 3.5 | 3.58 | 3.5 | 3.5 | 3.5 | 3.5 | 3.5 |
| Percent Water | 0.17 | 0.17 | 0.17 | 0.17 | 0.17 | 1.93 | 1.93 | 1.59 | 1.82 | 1.69 | 1.69 | 1.69 |
| Product (Ammonium Sulfate) Analysis: | | | | | | | | | | | | |
| Percent Acrylamide | 0.19 | 0.08 | 0.12 | 0.07 | 0.21 | 0.46 | 0.38 | 0.08 | 0.06 | 0.55 | .12 | .06 |
| Percent Water | 0.08 | 0.06 | 0.05 | 0.13 | 0.16 | 0.10 | 0.10 | 0.08 | 0.08 | 0.14 | .10 | .05 |
| Feed, Lbs. Acrylamide | | | | | [2] 6.21 | 3.2 | 6.5 | 6.3 | .46 | 6.3 | .77 | 1.05 |
| Scrubber, Lbs. Acrylamide Recovered | | | | | [3] 4.2 | 2.7 | 5.8 | 6.1 | .42 | 5.3 | .70 | 1.0 |

[1] Actual.
[2] Cumulative Feed for Examples 1 through 5.
[3] Total Recovered from Examples 1 through 5.

From the results appearing in the table, it is seen that the process of the present invention affords recovery of acrylamide in substantial yields. Thus, of the 6.2 pounds of acrylamide contained in the feed in Examples 1 to 5, 4.2 pounds are recovered. This represents a recovery of approximately 68%. The percent recovery of acrylamide in the other examples is even more especially noteworthy: Examples 6 and 10, 84%; Example 7, 89%; Example 8, 95%; Example 9, 91%; and Examples 11 and 12, 95%. At the same time, of course, the quality of the product, ammonium sulfate, is improved markedly. Thus, the amount of residual acrylamide is usually below about 0.50%. Further inspection of the data in all of the examples readily indicates the varied ratios of inert gas (air) to feed and residence times that may be employed. Finally, Examples 11 and 12 demonstrate that the process may also be conducted as a batch procedure with results comparable to those obtained in a continuous procedure as employed in Examples 1 to 10.

While the foregoing invention has been described in conjunction with certain preferred embodiments, it is to be understood that numerous other modifications may be made without departing from the scope of the invention. Consequently, the invention is to be construed broadly and is to be restricted only by the appended claims.

We claim:

1. A process for isolating acrylamide from a neutralization mixture resulting from the neutralization of acrylamide sulfate with a base comprising vaporizing the acrylamide by contacting said mixture with an inert gas having a temperature in excess of 20° C., and subsequently recovering acrylamide from said gas-containing acrylamide.

2. A process for isolating acrylamide from a neutralization mixture resulting from the neutralization of acrylamide sulfate with a base to form acrylamide and an acrylamide-containing salt, comprising removing said acrylamide-containing salt from said mixture, vaporizing the acrylamide by contacting said acrylamide-containing salt with an inert gas having a temperature in excess of 20° C., and subsequently recovering acrylamide from said gas-containing acrylamide.

3. A process as in claim 2 in which said acrylamide is recovered by cooling said gas-containing acrylamide to condense acrylamide therefrom.

4. A process as in claim 2 in which said acrylamide is recovered as an aqueous solution by washing said gas-containing acrylamide with water.

5. A process as in claim 2 in which said acrylamide is recovered as an organic solvent solution by washing said gas-containing acrylamide with an organic solvent.

6. A process as in claim 2 in which the temperature of the inert gas is maintained at from about 120° C. to 290° C. and the inert gas is air.

References Cited by the Examiner

UNITED STATES PATENTS

| | | | |
|---|---|---|---|
| 2,771,490 | 11/1956 | Stoddard et al. | 260—561 |
| 3,008,990 | 11/1961 | Weiss | 260—561 |
| 3,196,178 | 7/1965 | Kelley et al. | 260—560 |

NORMAN YUDKOFF, *Primary Examiner.*

NICHOLAS S. RIZZO, WILBUR L. BASCOMB, JR.,
*Examiners.*

R. PRICE, *Assistant Examiner.*